(12) United States Patent
Carlson

(10) Patent No.: US 6,806,429 B2
(45) Date of Patent: *Oct. 19, 2004

(54) BULK FLOW MEASUREMENT SYSTEM

(75) Inventor: Brent T. Carlson, Bloomington, MN (US)

(73) Assignee: Gustafson, LLC, Plano, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 10/208,064

(22) Filed: Jul. 30, 2002

(65) Prior Publication Data

US 2002/0185316 A1 Dec. 12, 2002

Related U.S. Application Data

(63) Continuation-in-part of application No. 09/658,216, filed on Sep. 8, 2000, now Pat. No. 6,472,615.

(51) Int. Cl.⁷ .......................... G01G 17/04; G01G 11/00
(52) U.S. Cl. ........................... 177/16; 177/60; 177/116; 177/119; 177/105; 222/77; 222/564
(58) Field of Search .......................... 177/16, 60, 105, 177/116, 119; 222/77, 564

(56) References Cited

U.S. PATENT DOCUMENTS

| | | | |
|---|---|---|---|
| 477,909 A | 6/1892 | Meier et al. | 34/568 |
| 504,125 A | 8/1893 | Dougan | 222/55 |
| 558,900 A | 4/1896 | Dougan | 241/34 |
| 771,598 A | 10/1904 | Baker | 222/55 |
| 932,944 A | 8/1909 | Baker | 222/55 |
| 2,100,315 A | 11/1937 | Harper | 222/55 |
| 2,561,392 A | 7/1951 | Marshall | 427/213 |
| 2,561,393 A | 7/1951 | Marshall | 427/213 |
| 2,561,394 A | 7/1951 | Marshall | 427/213 |
| 2,862,511 A | 12/1958 | Forsberg | 134/187 |
| 2,872,073 A | 2/1959 | Harper | 222/55 |

(List continued on next page.)

FOREIGN PATENT DOCUMENTS

EP 557567 A1 * 9/1993 ................ 222/584

Primary Examiner—Randy W. Gibson
(74) Attorney, Agent, or Firm—Patterson, Thuente, Skaar & Christensen, P.A.

(57) ABSTRACT

A grain flow measuring system for a flow rate of grain moving along a generally vertical grain flow path. The weight of grain conveyed along the flow path is measured when the grain impinges baffle elements, thereby generating a force corresponding to the grain weight. The force is transmitted to one or more load cells.

38 Claims, 9 Drawing Sheets

U.S. PATENT DOCUMENTS

| | | | | |
|---|---|---|---|---|
| 3,155,542 | A | 11/1964 | Cordell et al. | 118/303 |
| 3,213,867 | A | 10/1965 | McIntyre | 134/172 |
| 3,288,052 | A | 11/1966 | Hough | 99/485 |
| 3,473,779 | A | 10/1969 | Gustafson et al. | 251/9 |
| 3,605,688 | A | 9/1971 | Heden et al. | 118/303 |
| 3,912,231 | A | 10/1975 | Weber | 366/172.2 |
| 4,165,975 | A | 8/1979 | Kwiatkowski et al. | 63/29.17 |
| 4,275,682 | A | 6/1981 | Weber | 118/303 |
| 4,354,622 | A | 10/1982 | Wood | 222/55 |
| 4,407,217 | A | 10/1983 | Jackson | 118/24 |
| 4,596,206 | A | 6/1986 | Berge et al. | 118/303 |
| 4,660,665 | A | 4/1987 | Powell, Jr. | 177/145 |
| 4,688,610 | A | 8/1987 | Campbell | 141/83 |
| 4,729,442 | A | 3/1988 | Sichet | 177/50 |
| 4,902,206 | A | 2/1990 | Nakazawa et al. | 417/394 |
| 4,944,428 | A | 7/1990 | Gmür et al. | 222/55 |
| 5,002,140 | A | 3/1991 | Neümuller | 177/16 |
| 5,024,352 | A | 6/1991 | Gmür et al. | 222/1 |
| 5,054,652 | A | 10/1991 | Oshima et al. | 222/1 |
| 5,125,535 | A | 6/1992 | Ohlman | 222/77 |
| 5,148,841 | A | 9/1992 | Graffin | 141/83 |
| 5,219,031 | A | 6/1993 | Brandt, Jr. | 177/145 |
| 5,230,251 | A | 7/1993 | Brandt, Jr. | 73/861.72 |
| 5,409,020 | A | 4/1995 | Belvederi | 131/84.4 |
| 5,411,171 | A | 5/1995 | Quirling et al. | 222/1 |
| 5,622,250 | A | 4/1997 | Johanson | 198/550.1 |
| 5,632,819 | A | 5/1997 | Geissler | 118/712 |
| 5,637,836 | A | 6/1997 | Nakagawa et al. | 177/105 |
| 5,670,751 | A | 9/1997 | Häfner | 177/1 |
| 5,834,707 | A | 11/1998 | Wirth | 177/16 |
| 5,891,246 | A | 4/1999 | Lund | 118/13 |
| 5,945,638 | A | 8/1999 | Maddocks | 177/16 |
| 5,957,331 | A | 9/1999 | Minor et al. | 222/56 |
| 6,472,615 | B1 * | 10/2002 | Carlson | 177/16 |

* cited by examiner

BULK FLOW MEASUREMENT SYSTEM

CROSS REFERENCE TO RELATED APPLICATIONS

This application continuation-in-part of, U.S. patent application Ser. No. 09/658,216, filed Sep. 8, 2000 now U.S. Pat. No. 6,472,615.

BACKGROUND OF THE INVENTION

The present invention relates generally to a bulk materials measuring system. More particularly, specific embodiments of the present invention relate to an in-line grain flow measurement device that may be used to control subsequent processing.

In connection with the sale and transfer of products it is often important to accurately measure the amount of the product being sold and transferred. Accurate measurement of products being sold enables a company that manufactured the product to be adequately compensated for their efforts in manufacturing the product. Similarly, accurate measurement of products being transferred enables the transferor to be adequately compensated for the effort associated with transferring the products. Moreover, accurate measurement of product during the transfer of product allows subsequent processing, such as treatment with chemicals to be optimally performed; that is, precise amounts of materials for maximum effectiveness and minimal exposure.

Accordingly, large amounts of products are shipped in bulk such as by placing in a hopper-style railroad car or in a barge. While these shipping methods enable large amounts of product to be transferred, problems are often encountered when the product is transferred to an end user to ensure that the end user obtains a specified amount of product.

To make processing most expedient weighing, particularly in the context of process controlling, should be conducted on the material as it is moving. This allows adjustment of operational parameters on a real time or slightly delayed time frame for downstream processes.

Various techniques have been developed to measure the flow of bulk materials. Dougan, U.S. Pat. Nos. 504,125 and 558,900, each disclose systems for automatically controlling the flow of grain. The Dougan devices each have a plurality of angularly oriented baffles that are aligned perpendicular to the flow of grain. When the force exerted upon the baffles by the grain exceeds a desired level, a gate is activated to slow the flow of grain.

Baker, U.S. Pat. Nos. 771,598 and 932,944, each disclose controlling the flow of grain by allowing the grain to strike a series of angularly oriented plates. As the flow of grain exceeds a specified level, the force of the grain upon the angularly oriented plates causes a door through which the grain passes to be progressively closed.

Harper, U.S. Pat. No. 2,100,315, and Sichet, U.S. Pat. No. 4,729,442, each disclose measuring the flow rate of grain moving along a conveyor. Harper, U.S. Pat. No. 2,872,073, describes a system for measuring and controlling the flow of material from a hopper. The system includes a set of angularly oriented baffles that are aligned horizontally and perpendicular to the flow of material from the hopper. Grain striking the baffles causes the set of baffles to be deflected horizontally and perpendicular to the flow of grain from the hopper and so indicate the material flow rate. When the grain flow rate exceeds a specified level, the baffles engage a piston that is operably connected to a valve that reduces flow of material from the hopper.

Wood, U.S. Pat. No. 4,354,622, discloses a flow control system for controlling and measuring the rate at which material flows from a hopper. A gate valve is provided at a lower end of the hopper to control the flow of material from the hopper. A single angled impact plate is positioned below the hopper so that material passing through the gate valve deflects the impact plate and thereby causes a force that is indicative of the flow rate to be registered by a transducer.

Ohlman, U.S. Pat. No. 5,125,535, discloses measuring the flow of material from a hopper by depositing material upon a rotating disk. A portion of the disk is supported by a scale. Weight of the material on the scale is measured to determine the material flow rate.

Brandt, Jr., U.S. Pat. Nos. 5,230,251 and 5,219,031, each disclose measuring the flow rate of falling objects using an arcuate surface. The arcuate surface causes the downward force to be transformed into horizontal force.

SUMMARY OF THE INVENTION

In a preferred embodiment of the invention, a bulk material flow measuring and processing system measures a flow rate for material such as grain along a flow path and provides a control signal based on said flow for controlling a downstream process such as the amount of fuel for a dryer or an herbicide, fungicide, or insecticide applicator. In a preferred embodiment the system includes a grain measuring system, a control portion, a process portion, and a grain conveyance system. The grain measuring system includes a frame, a flow conditioning portion, and a flow measuring portion. The flow measuring portion has a baffle array attached to a lever arm that actuates a load cell upon deflection of the lever arm. The flow conditioning portion has two sets of static deflectors that change the direction of flow twice above the flow measuring portion. The flow conditioning portion is attached to the frame and absorbs the kinetic energy and any pressure head from the grain flow. The conditioning portion may also function as and include a regulating portion that limits the maximum grain flow rate. This may be provided by the limited area between the static deflectors. The output of the load cell may be connected to a control processor that provides a control signal to a process portion that may, for example, control a pump flow rate or a valve to vary the amount of herbicide injected in a seed coating apparatus.

In a second embodiment of the invention, and apparatus for weighing material being conveyed in a generally vertical flow path is provided. The apparatus may include a flow conditioning portion and a flow measuring portion. The flow conditioning portion, in turn, may include a flow conditioning baffle assembly. The flow measuring portion may be disposed generally downstream in the flow path from the flow conditioning portion and may include first and second flow measuring baffle sets and at least one load cell in mechanical communication with the first and second baffle sets. The second flow measuring baffle set may be generally downstream in the flow path from the first flow measuring baffle sets. Each baffle set may include a multiplicity of generally parallel baffle elements. The flow measuring baffle elements may be disposed such that the material being conveyed in the flow path impinges the flow measuring baffle elements to generate a force proportional and responsive to the weight of the material being conveyed in the flow path. The force may be communicated to the at least one load cell.

A feature and advantage of the invention is that flow of grain in a diverse range of flow rates may be measured.

A further feature and advantage of the invention is that the flow conditioning is done statically with no moving parts. Moreover, said conditioning is mechanically simple and provides flow rate control as well as controlling the kinetic energy of the falling grain, as well as any pressure associated with a head, that is, the potential energy of a stream of bulk material.

A further feature and advantage of the invention is that the measurement mechanism is mechanically simple and reliable. Moreover the mechanism portion, that is the pivot points and bearings are physically displaced from the flow of the bulk material. This provides a high level of reliability and lessens maintenance. Moreover, the configuration provides a labyrinth seal between the bulk material flow path and the exterior of the system. Although such seal is not air tight it provides excellent containment of the bulk material flow while still providing sufficient freedom of movement of the mechanisms for accurate and reliable operation.

A further feature and advantage of the invention is that the minimal vertical displacement between the conditioning portion and the measurement portion effectively eliminates kinetic and potential energy considerations of the bulk material flow being measured.

A further feature and advantage of the invention is that the flow rate regulation on the bulk material flow is optimally minimal and functions at only an upper limit. Moreover said regulation is done statically with no moving parts.

A further feature and advantage of one embodiment of the present invention is the presence of evacuation ports for dust removal before a substance, such as an insecticide, fungicide, or herbicide is applied to the grain.

A further feature and advantage of the present invention is an inspection door and a clean-out grate to remove foreign matter from the grain before the grain enters the scale to be weighed.

A further feature and advantage of the present invention is an optional inlet gate to better insure uniform, and remove surges from, grain flowing to the present system.

A further feature and advantage of the present invention is a baffle set. The baffle set slows the flow of grain while the grain is being weighed, thereby providing a more accurate weight.

Additional objects, advantages, and features of various embodiments of the invention will be set forth in part in the description which follows, and in part will become apparent to those skilled in the art upon examination of the following or may be learned by practice of the invention. The objects and advantages of various embodiments of the invention may be realized and attained by means of the instrumentalities and combinations particularly pointed out in the appended claims.

DETAILED DESCRIPTION OF THE PREFERRED EMBODIMENTS

All publications, patents, patent publications, and other documents cited herein are hereby incorporated by reference in their entirety. Definitions for materials and processes used in the present invention shall be those understood by persons of the ordinary skill in the art, unless express or implied definitions are present in this application or documents incorporated by reference. In case of conflict, definitions contained in the present application shall prevail. Any references to such relative terms as front and back, left and right, top and bottom, upper and lower, horizontal and vertical, or the like, are intended for convenience of description and are not contemplated to limit the present invention or its components to any one positional or spatial orientation. All dimensions of the components in the attached figures may vary with a potential design and the intended use of an embodiment of the invention without departing from the scope of the invention.

Figure 1:
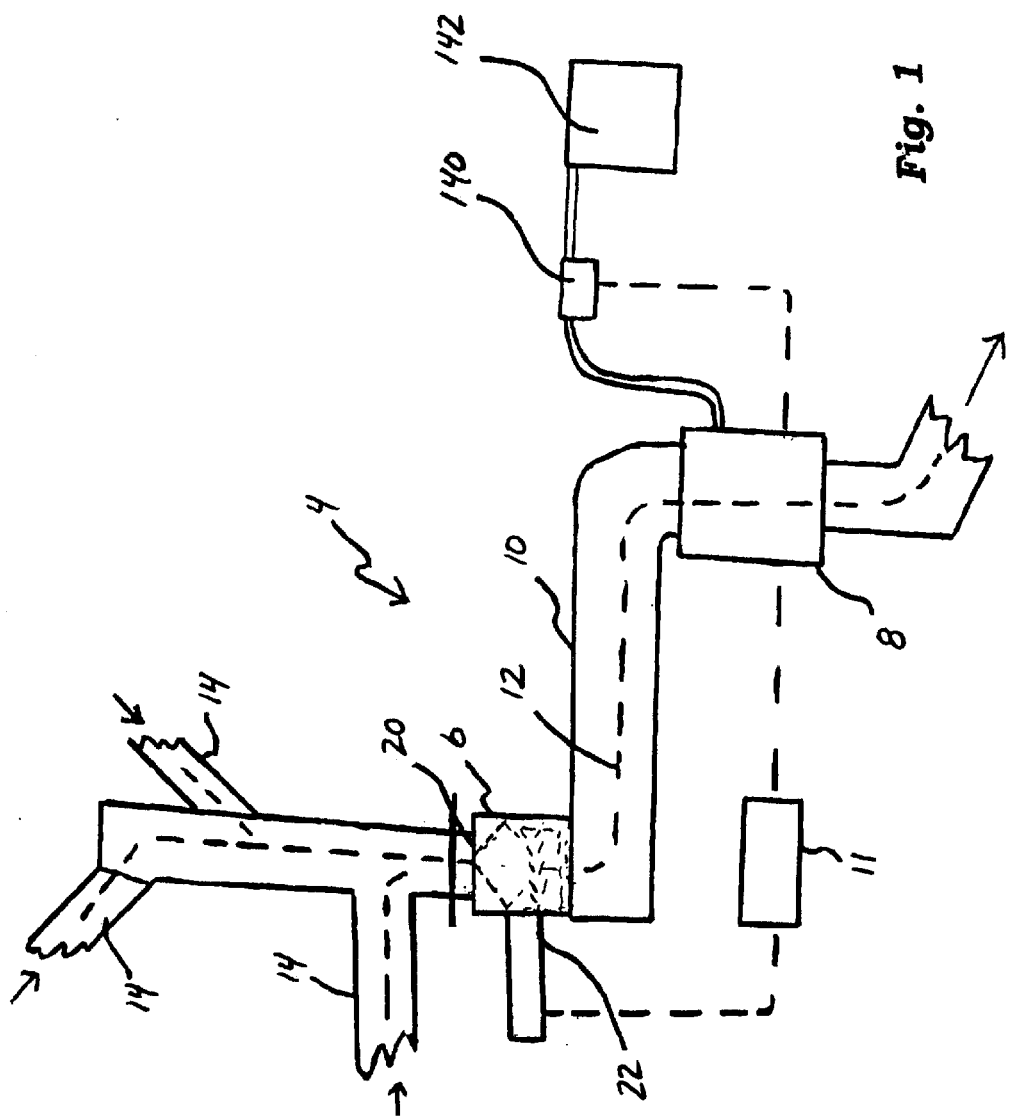
FIG. 1 is a schematic view of a measuring and process system in accordance with the invention.
Figure 2:
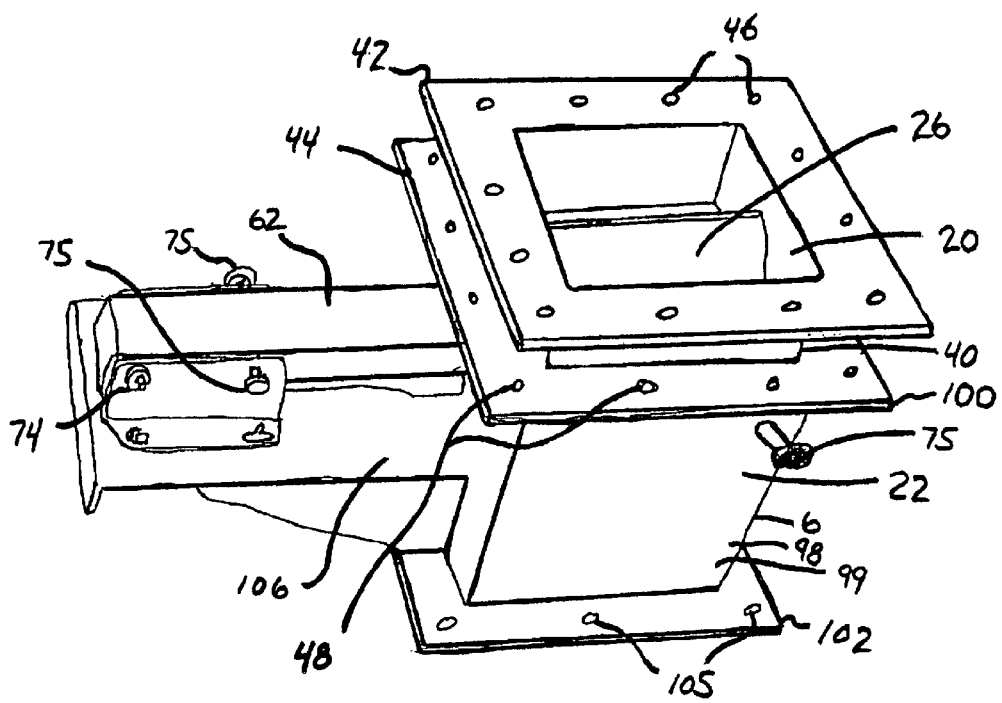
FIG. 2 is a perspective view of a grain flow measuring system in accordance with the invention herein.

Referring to FIG. 1 a preferred embodiment of the invention is illustrated and comprises a flow measurement and processing system generally identified with the numeral 4. Such a system is ideally suited for measuring and controlling the processing of grain or other materials but it is apparent the systems and components are suitable for measuring the flow of and controlling the processing of other bulk materials such as grain to be dryed, feed ingredients for livestock to be mixed, and fertilizer. Where "grain" is utilized in the specification herein, it is to be understood that bulk materials may be substituted therefore.

The system 4 as illustrated comprises a bulk flow measuring system 6, a processing portion 8, a conveyance system 10, and a control system 11 operatively connecting the measuring system 6 and the processing portion 8. The grain flow measuring system 4 enables the rate of grain flow to be accurately measured. The grain flow measurements are used for providing data or for process control and are described in detail below. The processing portion 8 is controllable equipment providing a process to the grain such as an applicator, for example, for herbicides, or a grain dryer.

The grain flow measuring and processing system 4 is placed in a flow path 12 of the conveyance system 10. Said conveyance system 10 may be comprised of augers, conveyor belts, gravity operated slides, chutes or other conveyance equipment. The grain flow measuring and processing system 4 permits the rate of grain flow to be measured with minimal interference with the flow of grain. Preferably, the grain flow measuring and processing system 4 is used with a generally vertically descending grain flow. As illustrated in FIG. 1, multiple feed sources 14 may be provided. The conditioning portion facilitates such multiple feed sources 14 by reducing the kinetic energy associated with faster falling grain from the more vertically displaced grain sources, thereby effectively equalizing the velocity of the grain when it impacts the baffle array of the measurement system 6. The control system 11 may be a conventional microprocessor control unit as is well known in the art. The control system 11 is connected to the measurement system 6 and is programmed to vary a process parameter in accordance with the measured flow rate. One such process parameter may be pump speed or valve opening for process portions such as herbicide, fungicide, or insecticide applicators. For dryers, the process parameter could be the amount of natural gas.

The grain flow measuring system 6 includes a flow conditioning portion 20 and a flow measuring portion 22. The flow conditioning portion 20 is located in the grain flow path 12 upstream from the flow measuring portion 22. These portions 20, 22 are vertically displaced by perhaps 0.5 to 1.5 feet to minimize the effects of the flow stream pressure head and kinetic energy.

The flow conditioning portion 20 has a first deflector or baffle 26 that substantially extends across a width of the flow conditioning portion 20, as most clearly illustrated in FIGS. 2–5. The first baffle 26 includes a first baffle section 28 and a second baffle section 30 that are preferably oriented substantially perpendicular to each other with a point 32 where the first baffle section 28 and the second baffle section 30 intersect upstream in the flow path 12 from ends 34 of the first baffle section 28 and the second baffle section 30 that are opposite the intersection point 32.

The flow conditioning portion 20 preferably has a substantially square profile with each side 40 having an approximately equal length. Preferably the length of each side 40 is about 6 inches. The flow conditioning portion 20 preferably includes an upper flange 42 and a lower flange 44 for attaching the flow conditioning portion 20 to the flow measuring portion 22 and the other components in the grain flow measuring system 4. Each of the flanges 42, 44 has at least one aperture 46, 48 formed therein that is adapted to receive connectors such as bolts (not shown) for attaching the components.

To facilitate grain transfer between the flow conditioning portion 20 and the flow measuring portion 22, a downstream end 50 of the flow conditioning portion 20 preferably has a width that is smaller than a width of an upstream end 52 of the flow conditioning portion 20. The flow conditioning portion 20 preferably includes a second deflector 53 configured as a tapered region 54 intermediate the upstream end 52 and the downstream end 50. The region 55 between the first deflector and the second deflector provides grain flow level regulation. The area limits the quantity of grain that can pass through.

The flow measuring portion 22 includes a bowl 60 and an lever arm 62 extending from the bowl 60. The bowl 60 preferably has a substantially square profile with sides 64. The sides 64 preferably have lengths approximately equal to the lengths of the sides 40.

The lever arm 62 preferably has a C-shaped configuration with top sections 70 and side sections 72. The C-shaped configuration enhances the structural rigidity of the arm 62. Opposite the bowl 60, a pivot point defined by a suitable pin or axle 74 extends through the side sections 72. Centering members 75, ideally formed of low friction material such as high density polyethylene, may be adjustable by way of threads.

Figure 3:
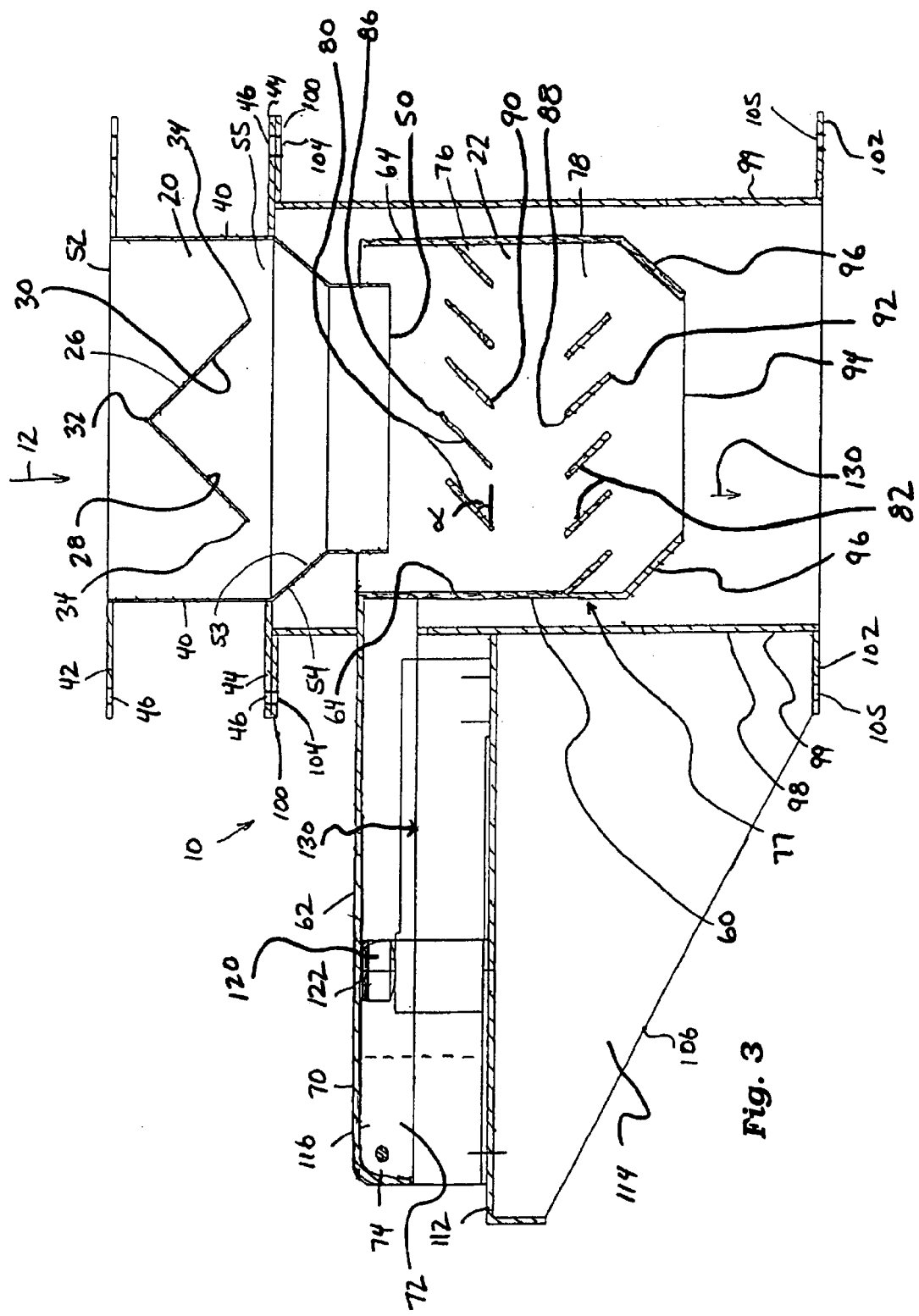
FIG. 3 is a sectional view of a grain flow measuring system of the present invention.
Figure 4:
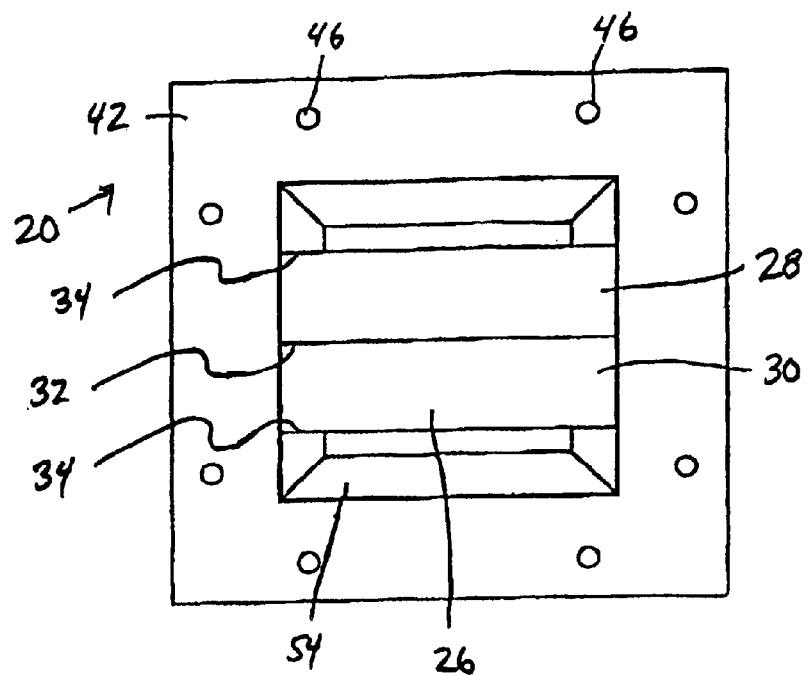
FIG. 4 is a top view of a flow conditioning portion of the grain flow measuring system of FIGS. 2 and 3.
Figure 5:
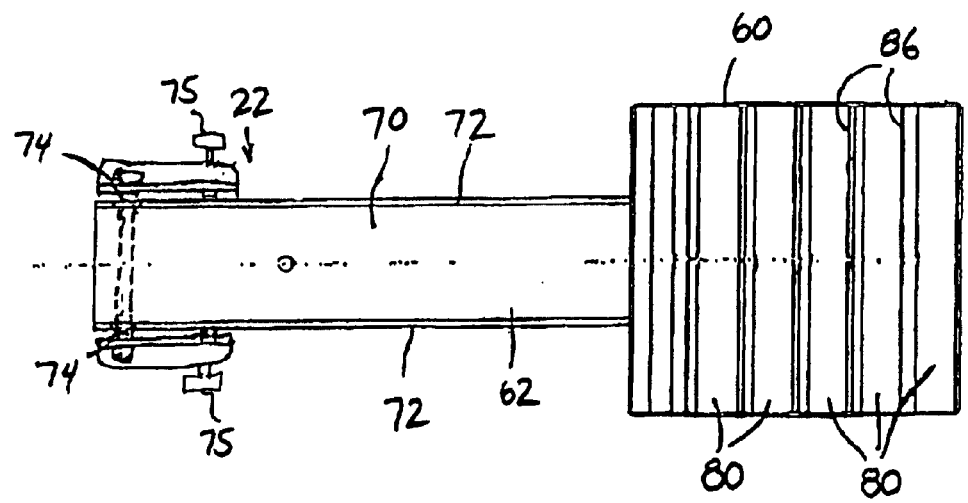
FIG. 5 is a top view of a flow measuring portion of the grain flow measuring system.

The flow measuring portion 22 has a baffle array 77 that includes second baffle set 76 and third baffle set 78 that are attached to the bowl 60, as most clearly illustrated in FIG. 3. The second baffle set 76 and the third baffle set 78 are both positioned in the grain flow path so that the third baffle set 78 is downstream from the second baffle set 76.

The second baffle set 76 includes a plurality of second baffle elements 80 that are aligned perpendicular to the flow path 12. There are preferably 5 third baffle elements 82 in the third baffle 78. The third baffle elements 82 each preferably have a length of approximately 1 inch or greater.

The third baffle set 78 includes a plurality of third baffle elements 82 that are aligned perpendicular to the flow path 12

Each of the second baffle elements 80 are preferably oriented parallel to each other. Similarly, each of the third baffle elements 82 are preferably oriented parallel to each other. The second baffle elements 80 are preferably perpendicular to the third baffle elements 82. The second baffle elements 80 are oriented at an angle alpha of between about 30 and 60 degrees and preferably about 45 degrees.

The second baffle elements 80 are preferably offset from the third baffle elements 82 so that a leading edge 86 of the second baffle elements 80 is aligned substantially above a leading edge 88 of the third baffle elements 82. The offset positioning of the second and third baffle elements 80, 82 causes a significant portion of the grain to strike at least one of the second and third baffle elements 80, 82 and thereby enhances the accuracy of the grain flow measuring process.

A distance between the lower edge 50 of the flow conditioning portion 20 and the leading edge 86 of the second baffle elements 80 is at least as large as a vertical height of the second baffle elements 80. Preferably, the distance between the lower edge 50 of the flow conditioning portion 20 and the leading edge 86 of the second baffle elements 80 is between one and two times as large as the vertical height of the second baffle elements 80.

A distance between a lower edge 90 of the second baffle elements 80 and leading edge 88 of the third baffle elements 82 is at least as large as a vertical height of the second baffle elements 80. Preferably, the distance between the lower edge 90 of the second baffle elements 80 and the leading edge 88 of the third baffle elements 82 is between one and two times as large as the vertical height of the second baffle elements 80.

A distance between a lower edge 92 of the third baffle elements 82 and a lower edge 94 of the bowl 60 is at least as large as a vertical height of the second baffle elements 80. Preferably, the distance between the lower edge 92 of the third baffle elements 82 and the lower edge 94 of the bowl 60 is between one and two times as large as the vertical height of the second baffle elements 80.

Opposite the grain regulator portion 20, the bowl 60 has an inwardly tapered region 96. The inwardly tapered region 96 facilitates transfer of grain from the flow measuring portion 22 to other portions of the grain moving system.

The grain flow measuring system 4 further includes a frame 98. The frame 98 extends around at least a section of the flow measuring portion 22. The frame 98 thereby prevents the escape of grain form the grain flow measuring system 4. The frame 98 has a square profile with sides 99 that are longer than the sides 64. The frame 98 has an upper flange 100 and a lower flange 102 for attaching the frame 98 to other parts of the grain flow system. To facilitate connections of the frame 98 to other components, the flanges 100, 102 each include a plurality of apertures 104, 105 that are adapted to receive connectors such as bolts (not shown).

Extending from the frame 98 is an arm 106. The arm 106 has a top portion 112 and a side portion 114 that are preferably oriented substantially perpendicular to each other in the shape of the letter T.

A plate 116 is attached to the top portion 112. The plate 116 has an aperture (not shown) extending therethrough.

Extending a bolt through the apertures 102 and the plate aperture (not shown) enables the flow measuring portion 22 to be pivotally mounted to the plate 116.

A load cell 120 is attached to the top portion 112 so that a load sensing plate 122 engages the top section 70. The load cell 120 may be operably connected to the process controller and/or a display device (not shown) that is capable of displaying the grain flow rate.

The components of the grain flow measuring system 4 are preferably fabricated from stainless steel. However, a person of ordinary skill in the art will appreciate that the grain flow measuring system 4 may be fabricated from other types of metallic or plastic materials. Selection of the types of materials, the thickness of the materials, and the dimensions of the grain flow measuring system is based upon the intended material flow rates and the type of material whose flow rate is being measured.

While the present invention has been described in conjunction with measuring the flow of grain, a person of ordinary skill in the art will appreciate that the flow rate measuring concepts of the present invention may be readily adapted for use with measuring the flow rates of other materials.

In operation, grain enters the grain flow measuring and processing system 4 along flow path 12. The flow may be through one or several flow ducts (feed sources) 14. The grain first enters the flow conditioning portion 20 of the measurement system 6 where the grain strikes the first deflector 26 and then is deflected against the sides 40. The first deflector 26 and the sides 40 absorb a significant portion of the kinetic energy of the grain as well as any head pressure. Moreover, the restrictive area of the tapered region 54 limits the amount of grain that may flow therethrough to the flow measuring portion 22.

The grain moves along the flow path 12 and enters the flow measuring portion 22. The grain strikes the second baffle elements 80, which causes the grain to be deflected. The grain then strikes the third baffle elements 82, which causes the grain to be again deflected. Thereafter, the grain continues the flow through the grain moving system.

The force of the grain striking the second and third baffle elements 80, 82 causes the bowl 60 to be deflected downwardly. The downward movement of the bowl 60 causes the arm 62 to pivot as indicated by arrow 130. Pivoting of the arm 62 urges the arm 62 away from the load sensing plate 122 that causes the load cell 120 to report a flow rate to the control processor and/or display device. Since the grain continues to flow through the grain flow measuring system 4, the grain flow measuring system 4 provides real-time data as to the grain flow rate to accurately determine the amount of grain being transferred. The control processor is configured to control one or more operational parameters of the process portion. For a herbicide applicator, such parameter may be the pump speed of pump 140 which connects to herbicide source 142.

Figure 6:
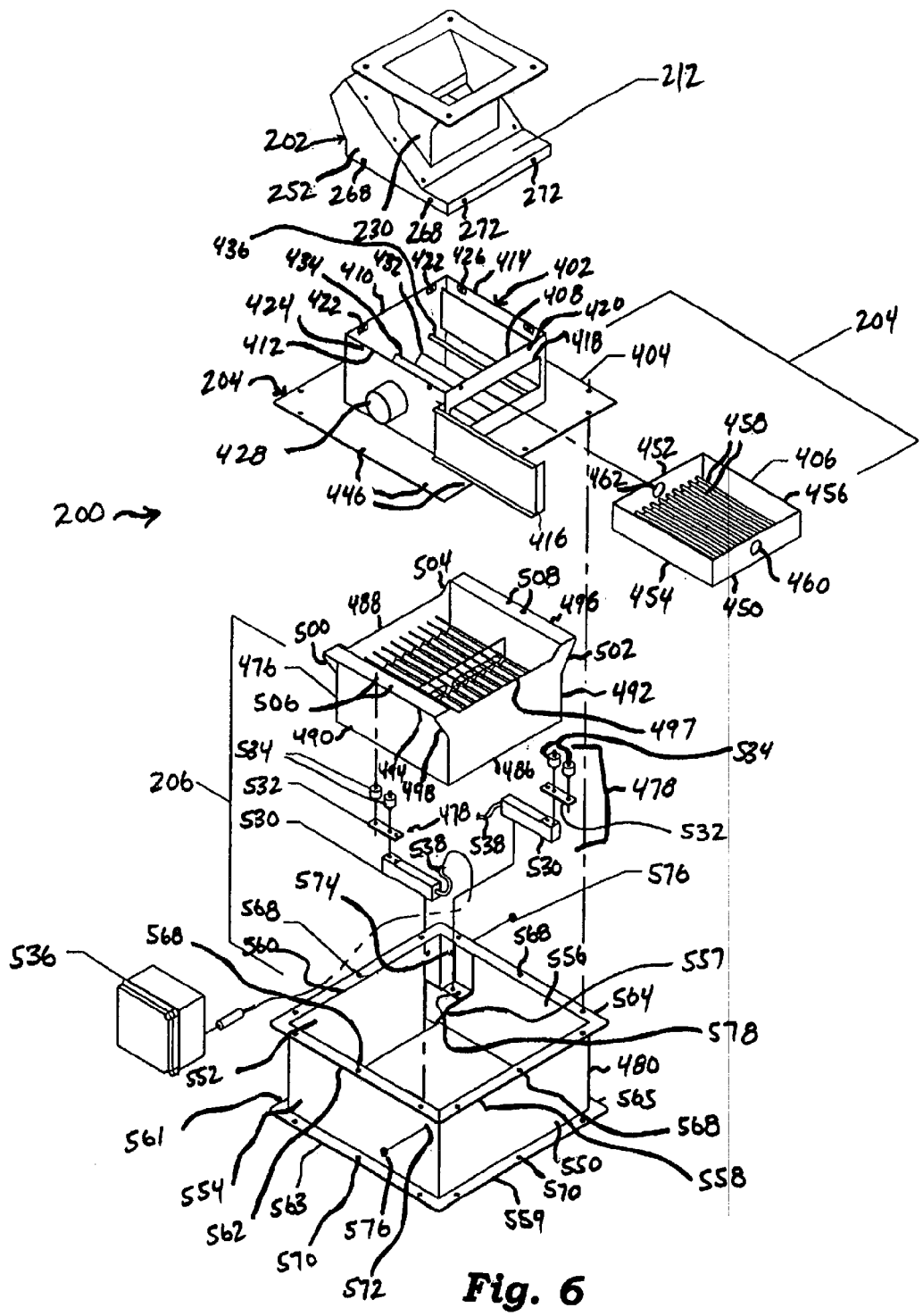
FIG. 6 is an exploded view of a second embodiment of the present measuring system.
Figure 7:
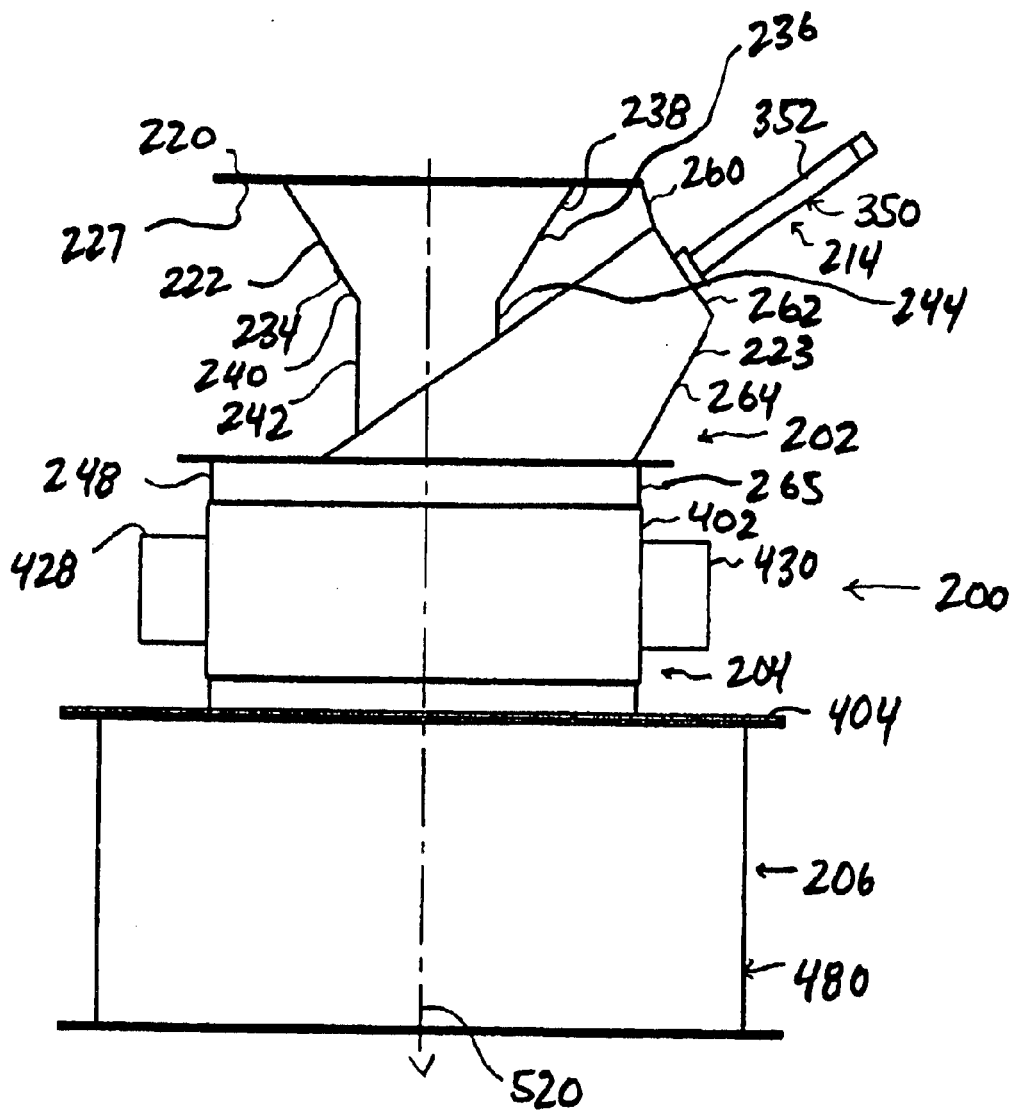
FIG. 7 is a side view of the measuring system of FIG. 6.
Figure 8:
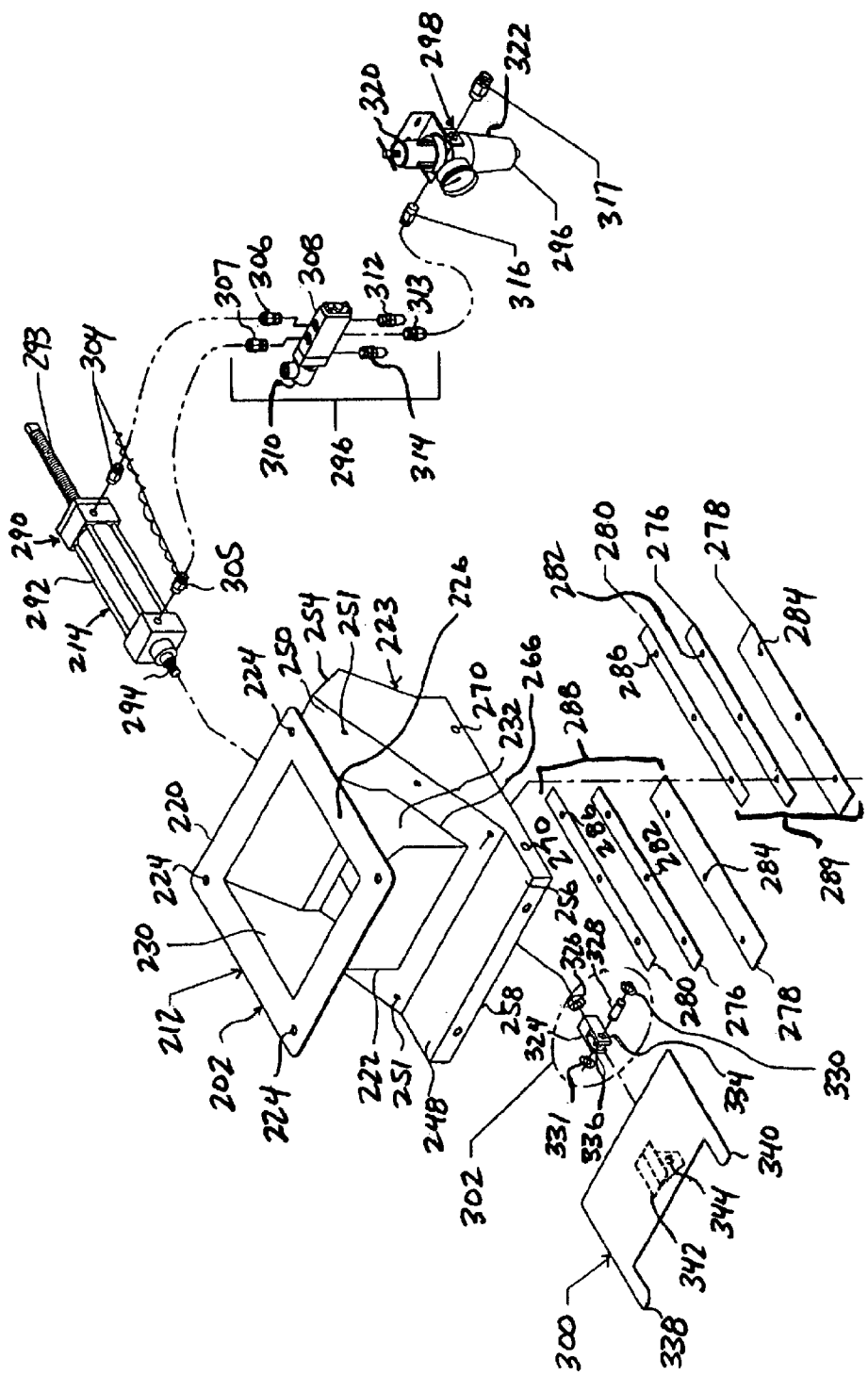
FIG. 8 is an exploded view of a first embodiment of a flow control assembly optionally used with the measuring system of FIG. 6.

Another embodiment of the present grain flow measuring system is depicted in FIGS. 6–10 generally at 200 and includes a flow regulating portion such as an inlet assembly 202 and an evacuation assembly 204 and a flow measuring portion such a scale assembly 206. As best seen in FIGS. 6, 7, and 8, the inlet assembly 202 may have an inlet 212 and an optional flow control assembly 214. The inlet 212, in turn, may have a flange 220 mounted atop an intake unit 222, the intake unit 222 operably mounted atop a frame 223. The flange 220 may define a plurality of holes 224 extending between an upper surface 226 and a lower surface 227. In this embodiment, the intake unit 222 has respective left and right lateral plates 230 and 232 and respective upper front and back plates 234 and 236. The lateral plates 230 and 232 are generally spaced apart in a parallel relationship. However, the upper front and back plates angle to define an upper portion 238 narrowing (tapering) to a lower portion 240. Lower front and rear plates 242 and 244, respectively, depend from the upper front and back plates 234 and 236 in this embodiment.

A base 248 depends from the remainder of the inlet 212 structure. The base 248 includes a respective first plate 250 defining holes 251, left and right second (side) plates 252 and 254, a third plate 256, a fourth plate 258, a fifth (upper), a sixth (middle), and a seventh (lower) plate, 260, 262, and 264, respectively. The first plate 250 angles upwardly from the fourth plate 258 and defines an opening 266. The intake unit 222 may be bonded, e.g., welded, to the first plate 250 so as to empty through the opening 266. The left and right second plates 252 and 254 and depend from the first plate 250 and the third plate 256. The fourth plate 258 depends from the third plate 256 and adjoins the left and right second plates 252 and 254. A plurality of holes, such as denoted by 268, 270, 272, and 274, are defined in respective left and right second plates 252 and 254, fourth plate 258, seventh rear plate 264, and an eighth rear plate 265. The first rear plate 260 extends between the flange 220 and the sixth rear plate 262. The sixth rear plate 262 extends between the first rear plate 260 and the seventh rear plate 264 and defines an opening (not shown) to accommodate the flow control assembly 214. The seventh rear plate 264 extends between the second rear plate 262 and the eighth rear plate 265. The eighth rear plate 265 depends from the seventh rear plate 264.

Optionally included maybe a plurality of spacers 276, guide plates 278, and shims 280. Respective holes 282, 284, and 286 may be defined in each spacer 276, guide plates 278, and shim 280. The spacers 276, guide plates 278, and shims 280 may be used to form respective left and right tracks 288 and 289 to accommodate a slide as more fully explained below. Each left and right track 288 and 289 is formed by contacting one of the shims 280 to an inner surface of the first plate 250, then contacting one of the spacers 276 to the shim 280, then contacting one of the guide plates 278 to the spacer 276. The left and right tracks 288 and 289 may be held in place against the first plate 250 by extending connectors, such as bolts, through the holes 282, 284, 286, and 251, then securing the connectors in place, e.g., by nuts. Obviously, other connectors such as rivets could be used for this purpose as well.

A pneumatic embodiment of the flow control assembly 214 is depicted in FIG. 8 at 290 and includes an air cylinder 292 with a threaded (rotating) slide adjusting rod 293 and a ram 294, a solenoid/valve assembly 286, a filter/regulator assembly 298, a slide 300, and a clevis assembly 302. The ram 294 is extended and retracted from the air cylinder in a manner explained below. The air cylinder 292 may be pneumatically accessed by press locks 304 and 305, which may be, in turn, pneumatically communicated to fittings 306 and 307 by air hoses (not shown). Each fitting 306 and 307 threads into a valve 308. A solenoid 310 actuates the valve 308. Fittings 312, 313, and 314 may be threaded into the valve 308 such that the fitting 313 provides pneumatic access to a source of compressed air. Compressed air is conveyed to the air cylinder 292 at a pressure determined by the regulator 320. Particulates may be removed from the compressed air by a filter (not shown) housed in a filter housing 322. In this embodiment, compressed air is conveyed from the compressed air source by a line (not shown) to the air filter via the press lock 317 through the filter, then through the regulator 320. From the regulator 320, the compressed air is conveyed through another air line (not shown) and via the press lock 316 to the valve 308 via the fitting 313. When the valve 308 is opened by the solenoid 310, the compressed air is conducted through air lines to the air cylinder 292 via pathways defined by the fitting 307 and the press lock 305 or by the fitting 306 and the press lock 304 to extend or retract the ram 294 from the air cylinder 292. In one embodiment, the ram 294 is extended by conveying air through the fitting 307 and press lock 305 to the air cylinder 292 and by conveying compressed air away from the air cylinder 292 via the fitting 306 and the press lock 304. The compressed air is then vented through fitting 312. When the ram 294 is retracted, the compressed air is routed from the valve 308 via the route defined by the fitting 306 and press lock 304 to the air cylinder 292 and from the air cylinder 292 the other route defined by the press lock 305 and the fitting 307, from where it is vented through the fitting 314.

The adjusting rod 293 can be threaded in or out of the air cylinder 292 to define the extent to which the ram 294 can be retracted. When the adjusting rod 293 is in a desired position, it can be fixed in place by tightening a locknut (not shown) against the air cylinder 292.

The clevis assembly 302 may include a clevis 324, one or more nuts 326, a pin 328, and a plurality of snap rings 330 and 331. The clevis 324 defines a first hole 332 (not shown) and second holes 334 and 336. The hole 332 is dimensioned to accommodate the ram 294 of the air cylinder 292. The holes 334 and 336 are sized to accommodate the pin 328. The nut 326 is threaded onto the ram 294, which is then extended through the hole 332 of the clevis 324. The nut 326 is then tightened against the clevis 324, so as to hold the clevis 324 in a desired position. A connector such as a bolt(not shown) may be threaded into an axially extending bore in the ram 295 (not shown) and tightened against the clevis 324 (or an optional washer) to secure the ram 294 to the clevis 324. The clevis 324 may be further secured to the ram 294 by tightening the nut 326 against the clevis 324. The slide 300 has a pair of extensions 338 and 340 and a bracket 342. A hole 344 is defined in the bracket 342. The slide 300 is attached to the clevis 324 by extending the pin 328 through the holes 334, 344, and 336, then securing the pin 328 in place with the snap rings 330 and 331. The amount of grain allowed to enter the present grain flow measuring system can be increased by retracting the ram 294, thereby the slide 300 to create an opening of increased size. The amount of grain entering the present grain flow measuring system can also be decreased by extending the ram 294 to thereby decrease the size of the opening formed by the slide 300. Although the present pneumatic flow control assembly is depicted as being operated by compressed air, a person of ordinary skill in the art will readily comprehend that flow control assemblies accomplishing this purpose could be operated by other means, such as a hydraulic pump or electromechanically.

Figure 9:
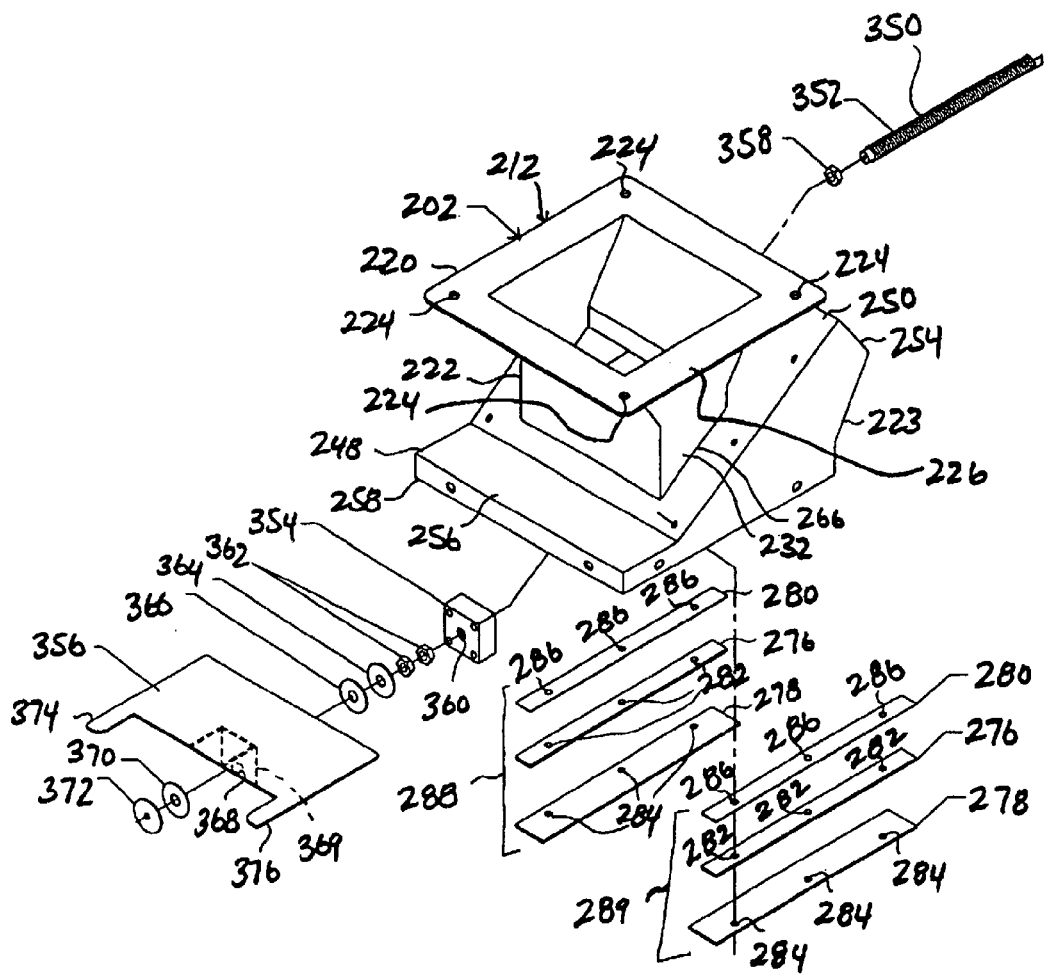
FIG. 9 is an exploded view of a second embodiment of a flow control assembly optionally used with the measuring system of FIG. 6.

One manually adjusting embodiment of the present flow control assembly is depicted in FIGS. 7 and 9 generally at 350 and includes a threaded slide adjusting rod 352, a guide block 354, and a slide 356. A nut 358 is threaded on the adjusting rod 352 and the guide block 354 is attached to an inner surface of the plate 262, e.g., by connectors such as bolts or rivets. The adjusting rod 352 is then threaded through an opening 360 in the guide block 354 until the adjusting rod 352 is in position to be attached to the slide 356. A plurality of nuts 362 are then threaded onto the adjusting rod 352, and the adjusting rod 352 is extended through the washers 364 and 366. The adjusting rod 352 is then further extended through a hole 368 defined in a bracket 369 of the slide 356, and through a washer 370. A washer 372 is then secured to the end of the slide adjusting rod 352 by threading a connector such as a bolt (not shown) into an axial bore (not shown) in the slide adjusting rod 352. The washers 366 and 370 may be Teflon thrust washers in some embodiments. The slide 356 may have extensions 374 and 376. The extensions 338 and 340 of the slide 300 and the extensions 374 and 376 of the slide 356 to be present to present (or minimize) binding as the slide is moved within the tracks 288 and 289.

In this embodiment, the evacuation assembly 204 includes a frame assembly 402 disposed within a base plate 404, and a screen assembly 406. The frame assembly 402, in turn, has a first (front) side 408, a second (rear) side 410, a third (left) side 412, a fourth (right) side 414, and a door 416 hinged to the first side 408. The first side 408 defines an opening 418 and a plurality of holes 420. The second side 410 defines holes 422. The third and fourth sides 412 in 414 define holes 424 and 426 and may include at least one airway 428 (and/or 430). The airways 428 conduct a flow of air through the present frame assembly to remove particles such as dust and chaff. A baffle assembly 431 has a central baffle 432 and lateral baffles 434 and 436. The baffles 432, 434, and 436 may have an inverted V-shape in cross section. The central baffle 432 and lateral baffles (left and right) 434 and 436 may be disposed so as to extend between the first and second sides 408 and 410 and beneath the screen assembly 406 when the screen assembly 406 is operably disposed within the frame assembly 402. In one embodiment, the central baffle 432 is situated at an elevated position with respect to the lateral baffles 434 and 436. Each baffle 432, 434, and 436 includes respective left and right baffle elements 438, 439, 440, 441, 442, and 443. The left baffle elements 440 and 442 are disposed so as to be generally parallel with respect to each other. Likewise, the right baffle elements 441 and 443 are disposed to be generally parallel with respect to each other as well. A plurality of holes 446 may be defined proximate the periphery of the base plate 404. The screen assembly 406 may include a first (front) side 450, a second (rear) side 452, a third (left) side 454, a fourth (right) side 456, and a plurality of bars 458 extending between the first and second sides 450 and 452. The first and second sides may define openings 460 and 462 to allow removal from the frame assembly 402. The bars 458 may be spaced apart, e.g., one inch on center, so as to screen out large particulates or foreign matter from the materials flowing through the present grain flow measuring system. Alternatively, a grid or screen may be used in lieu of the bars 458. The screen assembly 400 is dimensioned so as to be accommodated within the opening 418 of the frame assembly 402.

One embodiment of the present scale assembly includes a scale basket 476, one or more (e.g., a pair of) scale assemblies 478, and a scale body 480. The scale basket 476, in turn, may include a first (front) side 486, a second (rear) side 488, a third (left) side 490, a fourth (right) side 492, a first (left) plate 494, a second (right) plate 496 and a baffle assembly 497. The respective first and second sides 486 and 488 may include left extensions 498 and 500 and right extensions 502 and 504. The first plate 494 extends between the left extensions 498 and 500 and the second plate 486 extends between the right extensions 502 and 504. Holes 506 and 508 may be defined in respective first and second plates 494 and 486. The baffle assembly 497 includes a plurality of substantially parallel baffle element rows (sets) such as a first (upper) row 511 having substantially parallel first (upper) baffle elements 512, a second (middle) row 513 having substantially parallel second (middle) the baffle elements 514, and a third (lower) row 515 having substantially parallel third (lower) baffle elements 516. With respect to a direction 520 of grain flow, each baffle element may be considered to have a leading edge 522 and a trailing edge 524. The baffle elements are spaced apart such that in the trailing edge of one baffle element is disposed directly above the leading edge of the baffle element in a row directly below.

Each scale assembly 478 may include a load cell 530, a scale mount pad 532, and one or more mounting elements 534. One suitable embodiment for the load cell 530 is a model SP4, obtained from Hottinger Baldwin Measurement GmBH, Marlboro, Mass. The mounting elements 534 may be made from an elastic material such as rubber. A junction box 536 provides electrical connections for leads 538 extending from the load cells 530.

The scale body 480 may include a first (front) side 550, a second (rear) side 552, a third (left) side 554, a fourth (right) side 556, and one or more brackets 557. The respective sides 550–556 further include upper and lower flange pairs 558–559, 560–561, 562–563, and 564–565. Holes 568 may be defined in each upper flange and holes 570 may be defined in each lower flange. Holes 572 and 574 may also be defined in the third and fourth sides 554 and 556. The holes 572 and 574 enable grommets 576 to be inserted therein to protect the leads 538. As stated above, the leads 538 electrically connect the load cells 530 to the junction box 536 when the load cells 530 are operably disposed within the scale body 480.

When assembled, the load cells 530 are connected to the plates 494 and 486 to the scale basket 476, then mounted to the brackets 557. Each load cell 530 may be attached to a scale mount pad 532 with a mounting element 534 by extending a threaded portion of the element 534 through a hole in the scale mount pad 532 and threading the threaded portion in the load cell 534. A threaded portion of another mounting element 534 is extended through another hole in the scale mount pad 532 and fixed thereto, e.g., with a nut. The mounting elements 534 are then attached to the plates 494 and 486 by extending the other threaded portions of the mounting elements 534 through holes 506 or holes 508 and secured therein, e.g., by nuts. The load cells 530 and attached scale basket 476 may then be secured to the scale body 480 by securing the load cells 530 to the brackets 557. The load cells 530 may be secured to the brackets 557 by extending connectors, e.g., screws, through holes 578 defined in the brackets 557 and threading the connectors into the load cells 530.

The inlet assembly 202 is connected to an upstream portion of the conveyance system 10 by attaching the flange 220 to adjacent conveyance system components with connectors, e.g., bolts. The evacuation assembly 204 is assembled by placing the screen assembly 406 in the frame assembly 402 and closing the door 416. The assembled evacuation assembly 204 may be attached to the inlet assembly 202 by aligning the holes 420–426 of the evacuation assembly 204 with the holes 268–274 of the inlet assembly and threading connectors, e.g., screws, in the aligned holes. The scale assembly 206 is then attached to the remainder of the present grain flow measuring system by aligning holes 446 on the base 404 of the evacuation assembly 204 with the holes 568 of the scale assembly 206, then threading connectors, e.g., screws, through the aligned holes. The present flow measuring system is then connected to the remainder of the conveyance system 10 by aligning the holes 570 of the scale assembly 206 with suitably disposed and dimensioned holes defined in components of a downstream portion of the conveyance system 10, then securing, e.g., by threading screws therethrough. A positive or negative airflow source may be attached to one or more of the airways 428. Installing the present grain flow measuring system may be completed by electrically connecting the load cells 530 to the junction box 536. A person of ordinary skill in the art will readily recognize that the load cells 530 may be connected to a control system (described above with respect to control system 11) either directly or via the junction box 536. The grain flow measuring system 200 may be made from the same materials as the previously discussed embodiment.

Figure 10:
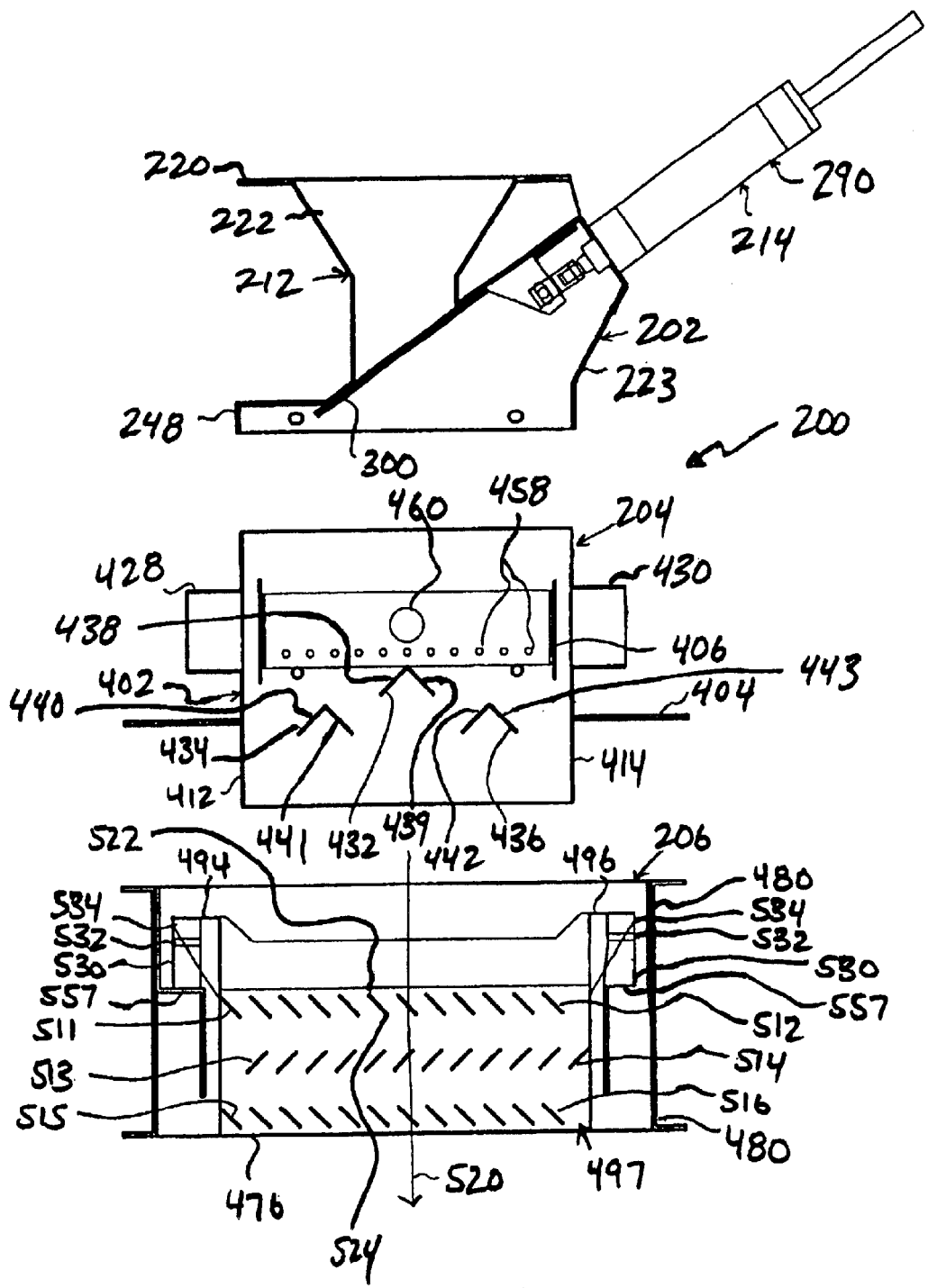
FIG. 10 is an exploded partial cross section of the measuring system of FIG. 6.

In operation and as best seen in FIG. 10, grain (or another flowable material) enters the present grain flow measuring system as described above, first encountering the inlet assembly 202. As the grain enters the inlet assembly 202, the flow of grain through the remainder of the present grain flow measuring system is regulated by opening or closing the slide 300 by operating the pneumatic flow control assembly 290 or the slide 356 by operating the manually operated flow control assembly 350. The regulated grain flow then enters the evacuation assembly 204. Upon entering the evacuation assembly 204, particulates and other impurities are screened out by the bars 458 and are otherwise removed from the grain flow by the moving air provided via the airways 428 and 430. After passing through the bars 458, the grain flow encounters the baffles 432, 434, and 436 where it is spread and evenly distributed in a widened flow path. After encountering the baffles in the evacuation assembly 234, the grain enters the scale assembly 206. In the scale assembly 206, the grain impinges on the baffle elements 512, 514, and 516. The force of the grain impinging the baffle elements 512, 514, and 516 exerts a force on the load cells 530. In response to the exerted force, the load cells 530 may send an electrical signal to the control system (as discussed above) to be further processed so that downstream processing of the material can be controlled in relation to the flow rate of the material.

It is contemplated that features disclosed in this application, as well as those described in the above applications incorporated by reference, can be mixed and matched to suit particular circumstances. Various other modifications and changes will be apparent to those of ordinary skill.

What is claimed is:

1. An apparatus for weighing material being conveyed on a generally vertical flow path, comprising:
   a flow conditioning portion comprising a flow conditioning baffle assembly; and
   a flow measuring portion generally downstream in the flow path from the flow conditioning portion and comprising first and second flow measuring baffle sets and at least one load cell in mechanical communication with the first and second flow measuring baffle sets, the second flow measuring baffle set generally downstream in the flow path from the first flow measuring baffle set, each first and second flow measuring baffle set including a multiplicity of respective generally parallel first and second flow measuring baffle elements, the first and second flow measuring baffle elements disposed such that the material being conveyed in the flow path impinges the flow measuring baffle elements, thereby imparting a force on the flow measuring baffle elements, the force corresponding to a weight of the material being conveyed in the flow path and mechanically communicated to the at least one load cell.

2. The apparatus of claim 1, the flow conditioning portion further comprising a screen assembly disposed substantially upstream in the flow path from the flow conditioning baffle assembly.

3. The apparatus of claim 2, the screen assembly comprising a multiplicity of substantially parallel bars.

4. The apparatus of claim 2, the flow conditioning portion further comprising a structure for conducting a stream of air from the screen assembly.

5. The apparatus of claim 1, the flow conditioning baffle assembly including first, second, and third baffles.

6. The apparatus of claim 5, in which the first baffle of the flow conditioning baffle assembly is disposed upstream in the flow path relative to the second and third baffles.

7. The apparatus of claim 5, in which the first, second, and third baffles are generally V-shaped in cross-section.

8. The apparatus of claim 1, the flow measuring portion further comprising a third flow measuring baffle set having a multiplicity of generally parallel third flow measuring baffle elements.

9. The apparatus of claim 8, in which the first flow measuring baffle elements are generally perpendicular to the second flow measuring baffle elements.

10. The apparatus of claim 8, in which the first flow measuring baffle elements are generally parallel to the third flow measuring baffle elements.

11. The apparatus of claim 1, the flow measuring portion comprising a plurality of load cells.

12. The apparatus of claim 1, the flow measuring portion further comprising a scale basket accommodating the first and second flow measuring baffle sets.

13. The apparatus of claim 12, the scale basket in mechanical communication to said at least one load cell.

14. The apparatus of claim 12, the flow measuring portion further comprising a scale body accommodating the scale basket.

15. The apparatus of claim 14, in which the at least one load cell is mounted to the scale body.

16. The apparatus of claim 1, further comprising a flow control assembly disposed generally upstream in the flow path from the flow conditioning portion.

17. The apparatus of claim 16, the flow control assembly comprising a flow control frame, a pneumatic air cylinder, and a slide, the pneumatic air cylinder in mechanical communication with the slide, the slide accommodated in the flow control frame.

18. The apparatus of claim 16, the flow control assembly comprising a flow control frame, a manual adjusting rod, and a slide, the manual adjusting rod in mechanical communication with the slide, the slide accommodated in the flow control frame.

19. A system for weighing grain being conveyed in a generally vertical flow path, comprising:
an inlet assembly;
an evacuation assembly downstream in the flow path from the inlet assembly and comprising a first evacuation assembly baffle set; and
a scale assembly downstream in the flow path from the evacuation assembly and comprising first and second scale assembly baffle sets and a plurality of load cells in mechanical communication with the first and second scale assembly baffle sets, the first scale assembly baffle set comprising a multiplicity of generally parallel first baffle set elements, the second scale assembly baffle set comprising a multiplicity of generally parallel second baffle set elements, the first baffle set elements generally perpendicular to the second baffle set elements, the grain sequentially conveyed through the inlet assembly, the evacuation assembly, and the scale assembly, the grain impinging the first and second baffle set elements, thereby generating a force substantially proportional to an amount of grain being conveyed through said system, the force mechanically communicated to the plurality of load cells.

20. The system of claim 19, the inlet assembly including a tapered structure and a flow control assembly, the tapered structure generally upstream in the flow path relative to the flow control assembly.

21. The system of claim 20, the inlet assembly further comprising a frame accommodating at least a portion of the flow control assembly.

22. The system of claim 21, the flow control assembly comprising a slide disposed in the frame.

23. The system of claim 22, in which the slide is pneumatically or manually activated.

24. The system of claim 19, the evacuation assembly comprising a frame and a screen assembly accommodated in the frame.

25. The system of claim 24, the screen assembly including a multiplicity of substantially parallel bars.

26. The system of claim 24, the frame including structure for conducting an air stream from the evacuation assembly frame.

27. The system of claim 24, the evacuation assembly further comprising second and third assembly baffle sets.

28. The system of claim 27, in which the first evacuation assembly baffle set is disposed generally upstream in the flow path from the second and third evacuation assembly baffle sets.

29. The system of claim 19, further comprising a third scale assembly baffle set having a multiplicity of generally parallel third baffle set elements, the third baffle set elements generally parallel to the first baffle set elements.

30. The system of claim 29, further comprising a scale basket accommodating the first, second, and third baffle sets and in mechanical communication with the plurality of load cells.

31. The system of claim 30, further comprising a scale body accommodating the scale basket and attached to the plurality of load cells.

32. A method of weighing material being conveyed in a generally vertical flow path, comprising conveying the material through a scale assembly, the scale assembly comprising first and second baffle sets, the first baffle set having a multiplicity of generally parallel first baffle set elements, the second baffle set having a multiplicity of generally parallel second baffle set elements, the material impinging said first and second baffle set elements while being conveyed through said scale assembly and thereby generating a force corresponding to the weight of material being conveyed, said force being communicated to a plurality of load cells.

33. The method of claim 32, further comprising conveying the material through an evacuation assembly before said material is conveyed through the scale assembly.

34. The method of claim 33, in which an air stream removes particulates from the material as the material is conveyed through said evacuation assembly.

35. The method of claim 33, in which the material impinges a plurality of evacuation assembly baffles as the material is conveyed through said evacuation assembly.

36. The method of claim 33, in which the material is conveyed through a screen while being conveyed through said evacuation assembly.

37. The method of claim 33, in which the material is metered by an inlet assembly before being conveyed through said evacuation assembly.

38. The method of claim 37, in which the material is metered by a pneumatically or manually actuated flow control assembly.

* * * * *